US009373208B2

(12) United States Patent
Candelore

(10) Patent No.: US 9,373,208 B2
(45) Date of Patent: Jun. 21, 2016

(54) SECURE REMOTE CONTROL FOR OPERATING CLOSURES SUCH AS GARAGE DOORS

(71) Applicant: Sony Corporation, Tokyo (JP)

(72) Inventor: Brant Candelore, San Diego, CA (US)

(73) Assignee: Sony Corporation, Tokyo (JP)

( * ) Notice: Subject to any disclaimer, the term of this patent is extended or adjusted under 35 U.S.C. 154(b) by 216 days.

(21) Appl. No.: 14/023,904

(22) Filed: Sep. 11, 2013

(65) Prior Publication Data

US 2015/0070132 A1 Mar. 12, 2015

(51) Int. Cl.
*G05B 19/00* (2006.01)
*G07C 9/00* (2006.01)

(52) U.S. Cl.
CPC .. *G07C 9/00182* (2013.01); *G07C 2009/00222* (2013.01); *G07C 2009/00928* (2013.01); *G07C 2209/04* (2013.01)

(58) Field of Classification Search
CPC ........... G07C 9/00111; G07C 9/00007; G07C 2209/64; G07C 2009/00222; G08C 2201/20; G08C 2201/50; G08C 2201/91; G08C 2201/93; G08C 17/02
USPC .................................. 340/5.73, 5.3, 5.6, 5.61
See application file for complete search history.

(56) References Cited

U.S. PATENT DOCUMENTS 5,471,218 A * 11/1995 Talbot .................. G01C 15/002 342/357.36
5,825,298 A * 10/1998 Walter ................... G01C 15/04 324/329
5,875,395 A * 2/1999 Holmes .............. G07C 9/00103 340/5.26
6,011,468 A * 1/2000 Lee ........................ G08B 13/22 340/539.1
7,382,250 B2 * 6/2008 Marcelle ............. E05B 47/0012 340/5.22
7,545,255 B2 * 6/2009 Ohtaki ................. H04B 13/005 340/5.23
8,500,005 B2 * 8/2013 Amor ...................... G01C 15/02 235/375
8,800,859 B2 * 8/2014 Amor ....................... G06F 17/30 235/375
8,903,978 B2 * 12/2014 Zerr ...................... H04W 4/008 709/223
8,933,778 B2 * 1/2015 Birkel ...................... B60R 25/24 340/5.54
8,947,202 B2 * 2/2015 Tucker ............... G07C 9/00309 340/426.13
9,024,721 B2 * 5/2015 McBride ............... B60R 25/245 340/5.2
2003/0043023 A1 * 3/2003 Perraud ................ G06K 7/0008 340/10.1
2003/0234293 A1 * 12/2003 Sauve .................... G01C 15/02 235/492
2004/0070489 A1 * 4/2004 Ueda ....................... E05B 85/01 340/5.61

(Continued)

OTHER PUBLICATIONS

"August Smart Lock", http://www.august.com/, web printout Oct. 15, 2013.

*Primary Examiner* — Jennifer Mehmood
*Assistant Examiner* — Rufus Point
(74) *Attorney, Agent, or Firm* — John L. Rogitz; John M. Rogitz

(57) ABSTRACT

Actuation of an access closure such as a garage door may be initiated by a remote control (RC) if a correct authentication code is received by the RC and/or if a designated authorization device such as a mobile phone is within near field communication transceiver range of the RC.

16 Claims, 3 Drawing Sheets

(56) References Cited

U.S. PATENT DOCUMENTS

| | | | | | |
|---|---|---|---|---|---|
| 2006/0164208 | A1* | 7/2006 | Schaffzin | G07C 9/00182 | 340/5.64 |
| 2007/0060056 | A1* | 3/2007 | Whitaker | H04M 1/72533 | 455/41.2 |
| 2007/0229219 | A1* | 10/2007 | Nakashima | B60R 25/04 | 340/5.61 |
| 2007/0273489 | A1* | 11/2007 | Tauchi | B60R 25/04 | 340/426.11 |
| 2007/0290793 | A1* | 12/2007 | Tran | G07C 9/00309 | 340/5.64 |
| 2008/0057929 | A1* | 3/2008 | Min | G08C 17/02 | 455/418 |
| 2009/0096573 | A1* | 4/2009 | Graessley | H04W 12/04 | 340/5.8 |
| 2009/0096578 | A1* | 4/2009 | Ogino | B60R 25/245 | 340/5.72 |
| 2009/0153290 | A1* | 6/2009 | Bierach | H04L 9/32 | 340/5.6 |
| 2009/0240814 | A1* | 9/2009 | Brubacher | H04W 8/18 | 709/227 |
| 2009/0289120 | A1* | 11/2009 | Hanson | G01C 15/02 | 235/462.1 |
| 2010/0109844 | A1* | 5/2010 | Carrick | G01S 5/14 | 340/10.1 |
| 2010/0117810 | A1* | 5/2010 | Hagiwara | G06F 3/0483 | 340/425.5 |
| 2010/0134240 | A1* | 6/2010 | Sims | G08C 17/02 | 340/5.1 |
| 2010/0144284 | A1* | 6/2010 | Chutorash | G08C 17/02 | 455/66.1 |
| 2010/0159846 | A1* | 6/2010 | Witkowski | G07C 9/00857 | 455/70 |
| 2010/0201482 | A1* | 8/2010 | Robertson | G07C 9/00111 | 340/5.61 |
| 2011/0016405 | A1* | 1/2011 | Grob | H04N 1/00127 | 715/740 |
| 2011/0153118 | A1* | 6/2011 | Lim | H04M 1/72533 | 701/2 |
| 2011/0241826 | A1* | 10/2011 | Blackwell, Jr. | G07C 9/00817 | 340/5.22 |
| 2011/0300802 | A1* | 12/2011 | Proctor, Jr. | G06Q 30/0623 | 455/41.2 |
| 2012/0075057 | A1* | 3/2012 | Fyke | G07C 9/00103 | 340/5.3 |
| 2012/0075059 | A1* | 3/2012 | Fyke | G06F 21/35 | 340/5.21 |
| 2012/0139698 | A1* | 6/2012 | Tsui | G08C 17/02 | 340/5.54 |
| 2012/0213362 | A1* | 8/2012 | Bliding | G07C 9/00309 | 380/44 |
| 2012/0280783 | A1* | 11/2012 | Gerhardt | G07C 9/00309 | 340/5.6 |
| 2012/0280790 | A1* | 11/2012 | Gerhardt | G07C 9/00309 | 340/5.61 |
| 2013/0093564 | A1* | 4/2013 | Martin | G07C 9/00896 | 340/5.54 |
| 2013/0099892 | A1* | 4/2013 | Tucker | G07C 9/00309 | 340/5.61 |
| 2013/0103200 | A1* | 4/2013 | Tucker | G01C 21/206 | 700/275 |
| 2013/0142269 | A1* | 6/2013 | Witkowski | H04B 7/0689 | 375/259 |
| 2013/0313315 | A1* | 11/2013 | Amor | G01C 15/02 | 235/375 |
| 2013/0314226 | A1* | 11/2013 | Zhang | G08B 21/24 | 340/539.11 |
| 2014/0125453 | A1* | 5/2014 | McIntyre | H04L 63/0853 | 340/5.7 |
| 2014/0225713 | A1* | 8/2014 | McIntyre | G07C 9/00309 | 340/5.61 |

* cited by examiner

Figure 3
Figure 4
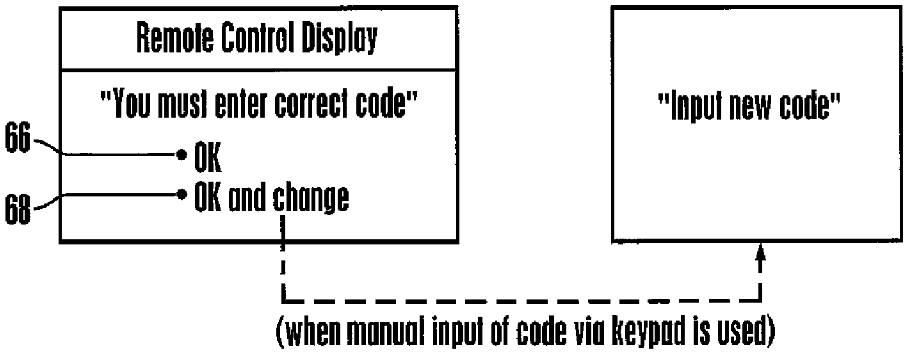
Figure 5
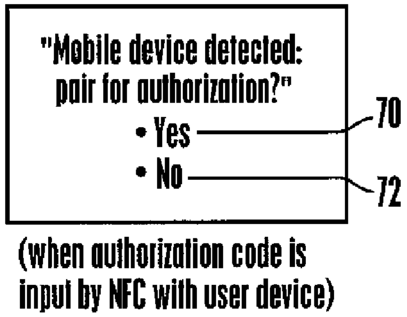
Figure 6
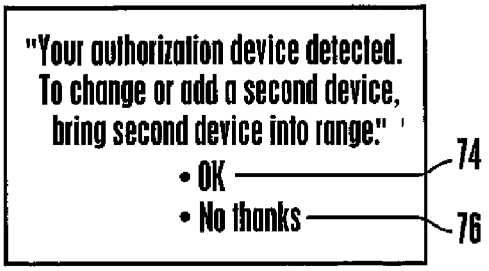
Figure 7
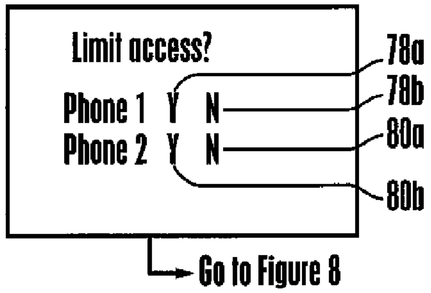
Figure 8
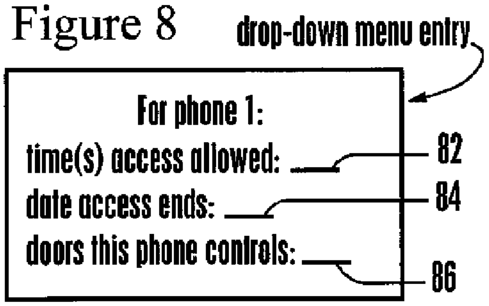
Figure 9
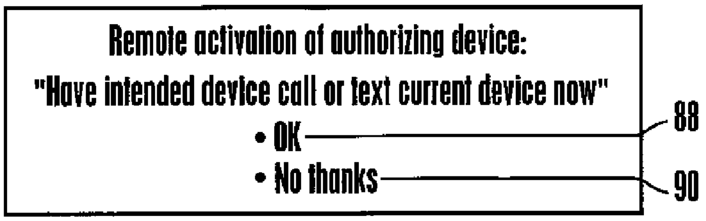

SECURE REMOTE CONTROL FOR OPERATING CLOSURES SUCH AS GARAGE DOORS

FIELD OF THE INVENTION

The present application relates generally to secure remote controls (RC) for operating closures such as garage doors.

BACKGROUND OF THE INVENTION

As understood herein, if a person parks his vehicle outside his home on the street and that vehicle contains a garage door opener (a remote control device for opening and closing powered garage doors), for example in the event that the person has a two car garage but three cars, one of which must be parked on the street at night, a security problem arises. A thief who gains access to the car on the street also gains access to the RC and can thus open the garage door. As further understood herein, it is often the case that people leave the door from the garage to an adjoining dwelling unlocked, meaning a thief who gains access to the RC in the vehicle on the street often thereby gains access to the interior of the dwelling. Similar considerations, as understood herein, can apply to other closures.

SUMMARY OF THE INVENTION

An apparatus includes at least one computer readable storage medium that is not a carrier wave and that is accessible to a processor. The computer readable storage medium bears instructions which when executed by the processor cause the processor to receive an actuation command generated by user manipulation of an actuation selector element on a remote control (RC). The processor also receives an authentication code that is not generated by user manipulation of the actuation selector element. The processor causes an access closure to actuate a closure in accordance with the actuation command in response to a determination that the authentication code is correct and otherwise does not cause the access closure to actuate the closure in accordance with the actuation command in response to a determination that no correct authentication code is received.

The apparatus can include a local processor associated with the closure, and the local processor may receive from the RC, along with the actuation command, a correct authentication code to execute the command. The authentication code may be received from a keypad entry element on the RC that is not the actuation selector element. The authentication code may alternatively be received from a user device in wireless communication with the RC, e.g. using telephony to establish a web connection via the internet to the RC, using near field communication (NFC), e.g. FeliCa, transceiver, or using short-wavelength radio (SWR), e.g. Bluetooth or WIFI, transceiver of the user device.

The authentication code can be set-up using a master code for the RC, or the access closure if the access closure checks the authentication code. The master code is a value initially provided by the manufacturer to owners to allow them to securely configure the RC or the access closure. The code would typically be listed on installation instructions and would be unique for each RC or access closure. As a convenience, the manufacturer may also provide some default authentication codes for immediate use. These would not require the owner to program them into the RC or the access closure. The owner inputs the master code and then can add or delete authentication codes including the default authentication codes. There may be any number of authentication codes that could be configured by the owner for various users of the RC or access closure. The master code may be changed from the manufacturer supplied code to a different one by the owner from a key entry element on the RC. With the master code, owners may be able to wirelessly log-in to the RC, e.g. using WIFI internet access, and remotely program the RC or access closure's authentication codes. Owners can do this with web-enabled wireless communication devices (WCD). An owner using a user device with wireless telephony may be able to log-in to the device using internet access via the mobile device's phone service provider to interface with the RC which also has local internet access through its WIFI connection. And using a remote user interface, the owner is able to manage the authentication codes—installing and deleting codes as well as setting parameters for use, e.g. single or multiple uses, usage during a particular time of day, etc. And using the master code, the NFC can be used to add an authentication code to the RC by passing the WCD physically close to the RC. This precludes the need for the owner to type in the authentication code for the WCD.

In another aspect, a method includes actuating an access closure by receiving from a remote control (RC) an actuation command, and actuating the access closure according to the actuation command only if a correct authentication code also is received by the RC and/or if a designated wireless communication device (WCD) is within NFC or SWR transceiver range of the RC and/or the access closure.

In another aspect, an access closure apparatus has a computer readable storage medium accessible to a processor configured for controlling a movable access closure. The computer readable storage medium bears instructions which when executed by the processor cause the processor to receive an actuation command generated by user manipulation of an actuation selector element on a remote control (RC), and also receive a signal indicating the presence of a wireless communication device (WCD) different from the RC. Responsive to a determination that the WCD is an approved WCD, the movable access closure is actuated in accordance with the actuation command. On the other hand, responsive to a determination that no approved WCD is present, the movable access closure is not actuated regardless of the presence of the actuation command.

In this latter aspect, if desired the processor must receive from the RC, along with the actuation command, a correct authentication code to execute the command. The authentication code may be received from a key entry element on the RC that is not the actuation selector element. The signal indicating the presence of the WCD can be received from a near field communication (NFC) or short-wavelength radio (SWR) transceiver of the WCD.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3-9 are example screen shots of RC for operating a closure such as a garage door according to present principles, it being understood that the screen shots of FIGS. 3-9 may be presented on the RC or on a companion controller such as a user device or a local access closure control panel.

DETAILED DESCRIPTION OF THE PREFERRED EMBODIMENT

Figure 1:
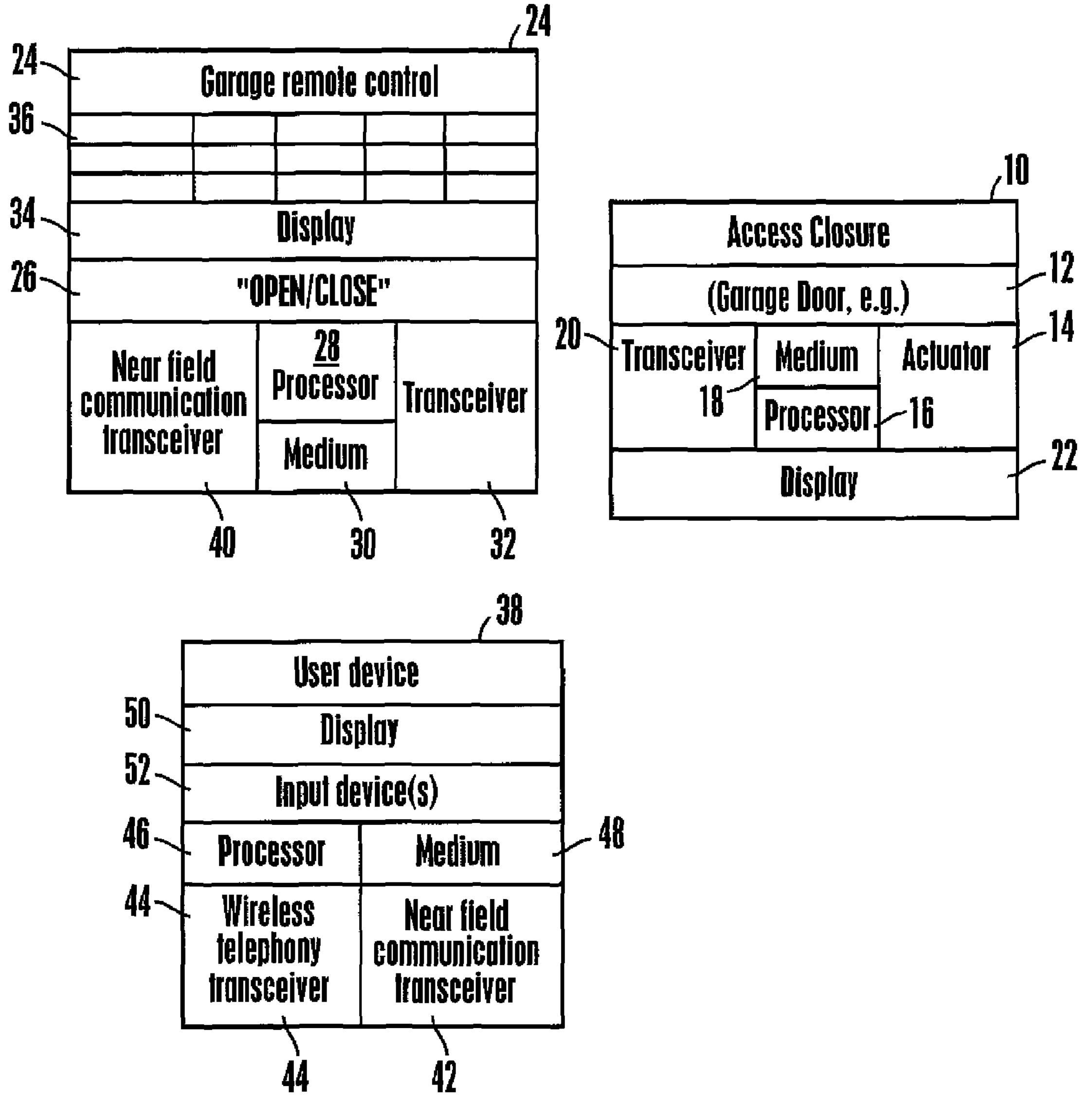
FIG. 1 is a block diagram of an example system according to present principles.

Referring initially to FIG. 1, a system 10 is shown which includes an access closure 12 such as a garage door that is opened and closed by an electro-mechanical actuator 14 under control of a local processor 16 accessing instructions on a computer readable storage medium 18 to operate the closure 12 in response to wireless commands received through a wireless transceiver 20. The processor 16 may output visual and/or audio data on a display 22. While the example closure 12 may be a front door, a garage door, alternate closures that can be controlled according to present principles include, as examples, gates, subscription parking lot closures, pass-protected hotels rooms, or other closures requiring a pass code to open and close. Typically, the local processor 16 is programmed to actuate the closure 12 only in response to predetermined command codes in a particular frequency or frequency band.

A remote control (RC) 24 is used to generate the open and close commands received by the local processor 16 through the transceiver 20. To this end, the RC 24 typically has a manipulable actuator button or key or other selector element 26 which when manipulated by a person cause an RC processor 28 accessing instructions on a computer readable storage medium 30 to generate an appropriately codes command and transmit the command to the access closure via an RC wireless transceiver 32. Alternatively, the command can be delivered using a wired interface, e.g. RS232 or Ethernet (not shown). The RC processor 28 may output information on a display 34 and when the display 34 is a touch screen display the selector element 26 may be a virtual key or selector element presented on the display 34.

According to present principles, a secondary code must be input to enable the actuation command generated by the RC 24. In one example, a person can input a secondary code to the RC processor 28 using a keypad 36 which can include alpha numeric keys. In another example, a person can input a secondary code to the RC processor 28 by disposing an authorized user device 38 nearby the RC 24, whose presence is detected by the RC 24 through a near field communication (NFC) transceiver 40. Alternatively, a short-wavelength radio (SWR) transceiver may be used (not shown). The NFC transceiver 40 may be any suitable short range wireless transceiver such as, for example, a FeliCa or IEEE 14443 transceiver that receives signals from a corresponding transceiver 42 of the user device 38.

Note that with respect to enabling the actuation command of the RC 24, several approaches are envisioned. In a first approach, without receiving the secondary code within, e.g., a few seconds previous or after the manipulation of the selector element 26, the RC 24 does not respond to manipulation of the selector element 26, i.e., without the secondary code the RC 24 simply does not transmit anything to the access closure. In a second approach, the secondary code is provided to the access closure which must receive both the actuation command resulting from manipulation of the selector element 26 as well as the secondary code, which may be sent from the RC 24 after receipt thereof from the keypad 36 or NFC transceiver 40. It is understood that instead of a NFC transceiver 40, a short-wavelength radio transceiver, e.g. Bluetooth or WIFI, can be used interchangeably.

In the example shown, the user device 38 is a mobile communication device which has a wireless telephony transceiver 44 and near field communication (NFC) transceiver 42 communicating with a user device processor 46 accessing instructions on a computer readable storage medium 48. It is understood that instead of a NFC transceiver 44, a short-wavelength radio transceiver, e.g. Bluetooth or WIFI, can be used interchangeably. The user device 38 may have a display 50 such as a touchscreen display and an input device such as a real or virtual (presented on the display 50) keypad or keyboard 52. Voice recognition software may also be used to receive voice input from a microphone (not shown).

Figure 2:
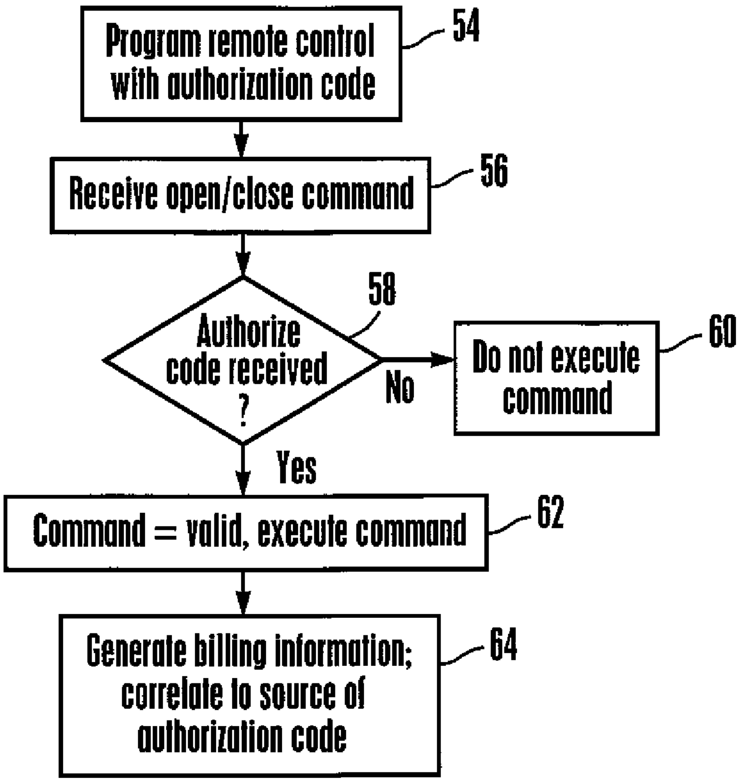
FIG. 2 is a flow chart of example logic.

With the above description in mind, attention is turned to FIG. 2. Commencing at block 54, the RC 24 is programmed with the secondary code, also referred to herein as the authentication code. Various ways to do this are described further below. An actuation command is received at block 56 and at decision diamond 58 it is determined whether a correct authentication code is also received along with the actuation command.

In one example, the logic of steps 56 and 58 is performed by the RC 24, which receives the actuation command by virtue of a user manipulating the selector element 26 and which determines whether a user has input the authentication code on the keypad 36 or equivalently whether an authorized user device 38 is nearby to be detected by the NFC transceiver 40, in which case the authentication code essentially can be the ID of the user device 38 as embodied by identifying data in the signal therefrom. In other embodiments a correct actuation code is established only by both a correct user input on the keypad 36 as well as detection by the NFC transceiver 40 of a nearby user device 38.

In another example, the logic of steps 56 and 58 is performed by the local processor 16, which receives the actuation command from the RC 24 responsive to a user manipulating the selector element 26 and which determines whether the RC 24 has also sent the authentication code either as input on the keypad 36 or equivalently as received from the signal of an authorized user device 38.

If either the actuation command or a correct authentication code is not determined to be present at decision diamond 58, the command is not executed at block 60. However, responsive to a determination at decision diamond 58 that both a correct actuation command from the RC transceiver 32 along with a correct authentication code have been received, the command is executed at block 62. Note that when the RC processor 28 executes the logic of steps 56 and 58, at block 62 the RC processor may send the actuation command to the access closure local processor 16 without the authentication code, since the authentication code has already been checked by the RC, with the local processor 16 then executing the command. On the other hand, when the RC 24 is "dumb" in the sense that it simply relays whatever authentication code is input to it along with the actuation command, the local processor 16 may receive both the actuation command and authentication code at steps 56 and 58 and if correct information is received, execute the actuation command at block 62.

If desired, billing information may be generated at block 64 such that the access owner can charge for limited access, or the original subscriber (e.g., a parking garage owner) can transfer subscription fees, to an account associated with the user device 38 when user device authentication code sourcing is used.

Now referring to FIG. 3, a screen shot of the display 34 of the RC 24 is shown and includes text instructing the user to manually input the correct code via keypad 36. The user may select the selector element "OK" 66 or the selector element "OK and change" 68. The text and selector elements 66, 68 may be presented on the display 34 under the control of the processor 28.

Upon user selection of selector element 68 and input of correct code, the processor 28 will present on the display 34 text instructing the user to input a new code. FIG. 4 illustrates a screen shot of the presentation of "Input new code" text. When presented with the screen shot in FIG. 4, the user may enter a new code using the keypad 36 and use that new entry for subsequent correct authentication code entry and actuation command signaling.

Moving in reference to FIG. 5, another embodiment in which an authorized user device 38 is nearby to be detected by the NFC transceiver 40 is demonstrated as a screen shot of the display 34 on RC 24. Text is displayed under the control of the processor 28 informing the user that a mobile device 38 has been detected and inquiring whether the user would like to pair the device 38 for authorization. The user may choose to pair the device 38 for authorization by selecting a selector element "Yes" 70 or may choose to not pair the device 38 by selecting selector element "No" 72. In this embodiment, pairing of the mobile device 38 for authorization will result in the actuation command signaling in response to the correct authentication code in the form of the ID of the user device 38 as embodied by identifying data in the signal therefrom.

The screen shot of FIG. 6 further demonstrates the present embodiment being capable of including a second device if the first authorization device 38 is in range. The processor 28 presents the user text on the display 34 informing the user that the first authorization device 38 is in range and instructing the user to bring a second device into range if the user would like to add or change that second device. The user may select selector element "OK" 74 and add or change a second authorization device once it is in range. The user may otherwise select selector element "No thanks" 76, thereby maintaining the first authorization device 38 as the source of the authentication code in the form of the ID of the authorization device 38 as embodied by identifying data in the signal therefrom.

Now referring to FIG. 7, a screen shot of the display 34 on RC 24 demonstrates the capability to limit access of authorization devices, here, Phone 1 and Phone 2. The user may not wish to limit access of either authorization device, in which case the user may select selector elements "No" 78*b* and 80*a* for Phone 1 and Phone 2, respectively. If the user chooses to limit the access of Phone 1 or Phone 2, the user may select selector element "Yes" 78*a* and 80*b*, respectively.

User selection of selector element "Yes" 78*a* can result in presentation of a drop down menu entry on the display 34 of RC 24 under the control of the processor 28, as illustrated by the screen shot in FIG. 8. The user may input access limitations of Phone 1 using the keypad 36. The time that access is allowed may be entered into entry field 82, the date access ends into entry field 84, and the doors that the phone controls into entry field 86. A similar drop down menu to limit access of Phone 2 may be presented subsequent to selector element "Yes" 80*b* selection.

FIG. 9 illustrates a screen shot presented on display 34 demonstrating capabilities of remotely activating an authorization device. Text presented on the display 34 under the control of the processor 28 instructs the user to have the intended device call or text the current device. The user may choose to do so and select selector element "OK" 88 and have the intended device call or text the RC 24 or, in another embodiment, call or text the access closure 12. The user may otherwise choose not to remotely activate the intended authorization device and select selector element "No thanks" 90. Remote activation of an intended authorization device via phone call or text can establish the authentication code that is necessary for the actuation command signaling.

It is important to note that while the screen shots in FIGS. 3-9 are presented on the display 34 of the RC 24 under the control of the processor 28 in these embodiments, the same screen shots may be presented on the display of a companion controller such as a the user device 38 or the local access closure control panel 12.

While the particular SECURE REMOTE CONTROL FOR OPERATING CLOSURES SUCH AS GARAGE DOORS is herein shown and described in detail, it is to be understood that the subject matter which is encompassed by the present invention is limited only by the claims.

What is claimed is:

1. An apparatus operatively associable with a vehicle garage, comprising:

at least one computer memory that is not a transitory signal and that comprises instructions executable by at least one processor to:

receive an actuation command generated by user manipulation of an actuation selector element on a remote control (RC);

receive, from a user device that is not the RC, an authentication code that is not received from he RC;

responsive to a determination that the authentication code is correct, actuate a movable access closure of the vehicle garage in accordance with the actuation command;

responsive to a determination that no correct authentication code is received, not actuating the movable access closure regardless of the presence of the actuation command such that the movable access closure is not actuated unless both the actuation command from the RC and the authentication code from the user device are both received.

2. The apparatus of claim 1, wherein the apparatus includes a local processor associated with the closure, and the instructions are executable by the local processor to receive from the RC, along with the actuation command, a correct authentication code to execute the command.

3. The apparatus of claim 1, wherein the instructions are executable to receive the authentication code from one of a near field communication (NFC) transceiver of the user device, and a short-wavelength radio transceiver of the user device.

4. The apparatus of claim 3, wherein the instructions are executable to initially establish the authentication code using communication over near field communication (NFC) or short-wavelength radio sent between the user device and the RC and/or the access closure during configuration of the RC and/or access closure.

5. A method comprising:

actuating an access closure by:

receiving from a remote control (RC) an actuation command generated by user manipulation of the RC;

actuating the access closure according to the actuation command only if a designated wireless communication device (WCD) is within near field communication (NFC) or short-wavelength radio transceiver range of the RC and/or the access closure, such that the access closure is not actuated unless both the actuation is received and the WCD is present near the RC and/or the access closure.

6. The method of claim 5, comprising actuating the access closure according to the actuation command only if a correct authentication code also is received by the RC.

7. An access closure apparatus comprising:

at least one computer memory that is not a transitory signal and that comprises instructions executable by at least one processor to:

receive an actuation command generated by user manipulation of an actuation selector element on a remote control (RC);

receive a signal indicating the presence of a wireless communication device (WCD) different from the RC such that responsive to a determination that the WCD is an approved WCD, a movable access closure is actuated in accordance with the actuation command and responsive to a determination that no approved WCD is present, the movable access closure is not actuated regardless of the presence of the actuation command, wherein:

the actuation command includes an authentication code established using a master code associated with the RC and/or the movable access closure, the master code including a value initially provided by a manufacturer to owners to allow owners to securely configure the RC or the access closure.

8. The apparatus of claim 7, wherein the instructions are executable to receive from the RC, along with the actuation command, a correct authentication code to execute the command.

9. The apparatus of claim 8, wherein the instructions are executable to receive the authentication code from a key entry element on the RC that is not the actuation selector element.

10. The apparatus of claim 7, wherein the instructions are executable to receive the signal indicating the presence of the first WCD from a near field communication (NFC) or short-wavelength radio transceiver of the first WCD.

11. The apparatus of claim 7, wherein the instructions are executable to initially establish a correct WCD identity against which the signal indicating the presence of the first WCD is compared by NFC or short-wavelength messaging sent between the first WCD and the RC during RC configuration.

12. The apparatus of claim 7, wherein the instructions are executable to initially establish a correct WCD identity against which the signal indicating the presence of the first WCD is compared by NFC or short-wavelength message sent between the first WCD and the processor.

13. An apparatus comprising:

at least one computer memory that is not a transitory signal and that comprises instructions executable by at least one processor to:

receive an authentication code from a telephone call or a text message from a wireless communication device (WCD);

receive an actuation signal generated by user manipulation of a actuation selector element of a remote control (RC) different from the WCD;

responsive to a determination that the authentication code is correct, send, from the apparatus, an actuation command to a movable access closure, the actuation command configured to cause the movable access closure to move, the apparatus not being the movable access closure; and responsive to a determination that no correct authentication code is received, not send the actuation command to the movable access closure.

14. The apparatus of claim 1, comprising the at least one processor.

15. The apparatus of claim 7, comprising the at least one processor.

16. The apparatus of claim 13, comprising the at least one processor.

* * * * *